United States Patent
Golla et al.

(10) Patent No.: US 7,861,063 B1
(45) Date of Patent: Dec. 28, 2010

(54) DELAY SLOT HANDLING IN A PROCESSOR

(75) Inventors: Robert T. Golla, Round Rock, TX (US); Paul J. Jordan, Austin, TX (US); Jama I. Barreh, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1706 days.

(21) Appl. No.: 10/881,217

(22) Filed: Jun. 30, 2004

(51) Int. Cl.
*G06F 9/30* (2006.01)
(52) U.S. Cl. ..................................... 712/214
(58) Field of Classification Search .................. 712/214
See application file for complete search history.

(56) References Cited

U.S. PATENT DOCUMENTS

| | | | |
|---|---|---|---|
| 5,046,068 A | 9/1991 | Kubo et al. | |
| 5,257,215 A | 10/1993 | Poon | |
| 5,339,266 A | 8/1994 | Hinds et al. | |
| 5,386,375 A | 1/1995 | Smith | |
| 5,515,308 A | 5/1996 | Karp et al. | |
| 5,546,593 A | 8/1996 | Kimura et al. | |
| 5,619,439 A | 4/1997 | Yu et al. | |
| 5,809,294 A * | 9/1998 | Ando | 712/233 |
| 5,941,983 A * | 8/1999 | Gupta et al. | 712/214 |
| 5,954,789 A | 9/1999 | Yu et al. | |
| 6,055,628 A * | 4/2000 | Seshan et al. | 712/235 |
| 6,076,157 A | 6/2000 | Borkenhagen et al. | |
| 6,088,788 A | 7/2000 | Borkenhagen et al. | |
| 6,088,800 A | 7/2000 | Jones et al. | |
| 6,105,127 A | 8/2000 | Kimura et al. | |
| 6,131,104 A | 10/2000 | Oberman | |
| 6,212,544 B1 | 4/2001 | Borkenhagen et al. | |
| 6,282,554 B1 | 8/2001 | Abdallah et al. | |
| 6,308,319 B1 | 10/2001 | Bush et al. | |
| 6,341,347 B1 | 1/2002 | Joy et al. | |
| 6,349,319 B1 | 2/2002 | Shankar et al. | |
| 6,357,016 B1 | 3/2002 | Rodgers et al. | |
| 6,397,239 B2 | 5/2002 | Oberman et al. | |
| 6,415,308 B1 | 7/2002 | Dhablania et al. | |
| 6,427,196 B1 | 7/2002 | Adiletta et al. | |
| 6,434,699 B1 | 8/2002 | Jones et al. | |
| 6,496,925 B1 | 12/2002 | Rodgers et al. | |
| 6,507,862 B1 | 1/2003 | Joy et al. | |

(Continued)

OTHER PUBLICATIONS

Tulsen et al., "Power-sensitive multithreaded architecture," IEEE 2000, pp. 199-206.

(Continued)

*Primary Examiner*—Eddie P Chan
*Assistant Examiner*—Jacob Petranek
(74) *Attorney, Agent, or Firm*—Lawrence J. Merkel; Meyertons, Hood, Kivlin, Kowert & Goetzel, P.C.

(57) ABSTRACT

In one embodiment, a processor comprises a fetch unit and a pick unit. The fetch unit is configured to fetch instructions for execution by the processor. The pick unit is configured to schedule instructions fetched by the fetch unit for execution in the processor. The pick unit is configured to inhibit scheduling a delayed control transfer instruction (DCTI) until a delay slot instruction of the DCTI is available for scheduling. For example, in some embodiments, the pick unit may inhibit scheduling until the delay slot instruction is written to an instruction buffer, until the delay slot instruction is fetched, etc.

27 Claims, 11 Drawing Sheets

U.S. PATENT DOCUMENTS

| | | | |
|---|---|---|---|
| 6,523,050 | B1 | 2/2003 | Dhablania et al. |
| 6,564,328 | B1 | 5/2003 | Grochowski et al. |
| 6,567,839 | B1 | 5/2003 | Borkenhagen et al. |
| 6,594,681 | B1 | 7/2003 | Prabhu |
| 6,625,654 | B1 | 9/2003 | Wolrich et al. |
| 6,629,236 | B1 | 9/2003 | Aipperspach et al. |
| 6,629,237 | B2 | 9/2003 | Wolrich et al. |
| 6,651,158 | B2 * | 11/2003 | Burns et al. .................. 712/205 |
| 6,668,308 | B2 | 12/2003 | Barroso et al. |
| 6,668,317 | B1 | 12/2003 | Bernstein et al. |
| 6,671,827 | B2 | 12/2003 | Guilford et al. |
| 6,681,345 | B1 | 1/2004 | Storino et al. |
| 6,687,838 | B2 | 2/2004 | Orenstien et al. |
| 6,694,347 | B2 | 2/2004 | Joy et al. |
| 6,694,425 | B1 | 2/2004 | Eickemeyer |
| 6,697,935 | B1 | 2/2004 | Borkenhagen et al. |
| 6,728,845 | B2 | 4/2004 | Adiletta et al. |
| 6,748,556 | B1 | 6/2004 | Storino et al. |
| 6,772,325 | B1 * | 8/2004 | Irie et al. .................... 712/238 |
| 6,785,804 | B2 | 8/2004 | Kruckemyer |
| 6,801,997 | B2 | 10/2004 | Joy et al. |
| 6,820,107 | B1 | 11/2004 | Kawai et al. |
| 6,847,985 | B1 | 1/2005 | Gupta et al. |
| 6,857,064 | B2 | 2/2005 | Smith et al. |
| 6,859,874 | B2 | 2/2005 | Kruckemyer |
| 6,883,090 | B2 | 4/2005 | Kruckemyer |
| 6,883,107 | B2 | 4/2005 | Rodgers et al. |
| 6,889,319 | B1 | 5/2005 | Rodgers et al. |
| 6,898,694 | B2 | 5/2005 | Kottapalli et al. |

OTHER PUBLICATIONS

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Issue on an Implementable Simultaneous Multithreading Processor," pp. 191-202.

Uhrig, et al., "Implementing Real-Time Scheduling Within a Multithreaded Java Microcontroller," 8 pages.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages.

Eberle, et al., "Cryptographic Processor for Arbitrary Elliptic Curves over $GF(2^m)$," 11 pages.

Alverson et al., "Tera Hardware-Software Cooperation," Tera Computer Company, 1997, (16 pages).

Alverson et al., "The Tera Computer System," Tera Computer Company, 1990, (pp. 1-6).

Alverson et al., "Exploiting Heterogeneous Parallelism on a Multithreaded Multiprocessor," Tera Computer Company, 1992, (pp. 188-197).

Smith et al., "The End of Architecture," 17th Annual Symposium on Computer Arcitecture, Seattle, Washington, May 29, 1990, (pp. 10-17).

Ungerer et al., "A Survey of Processors with Explicit Multithreading," ACM Computing Surveys, vol. 35, No. 1, Mar. 2003, (pp. 29-63).

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | 0 | 1 | 2 | 3 | 4 | 5 | 6 | 7 |

Fig. 3

|  | 0 | 1 | 2 | 3 | 4 | 5 | 6 |
|---|---|---|---|---|---|---|---|
| Thread i State | Ready | Ready | Wait | Wait | Ready | Ready | Ready |
| IB_Ti[1] | DCTI |  |  |  | I1 |  |  |
| IB_Ti[0] | I0 | DCTI | DCTI | DCTI | DCTI | I1 |  |
| D |  | I0 |  |  |  | DCTI | I1 |
| E |  |  | I0 |  |  |  | DCTI |

↑ Cancel_Pick[i]      ↑ WIBT[i]

Fig. 10

|  | 0 | 1 | 2 | 3 |
|---|---|---|---|---|
| Thread i State | Ready | Ready | Ready | Ready |
| IB_Ti[1] | I0 |  |  |  |
| IB_Ti[0] | DCTI | I0 | I0 |  |
| D |  | DCTI |  |  |
| E |  |  | DCTI |  |

↑ Annul

Fig. 11

| Thread i State | 0 Ready | 1 Ready | 2 Ready | 3 Ready |
|---|---|---|---|---|
| IB_Ti[1] | I0 | | | |
| IB_Ti[0] | DCTI | I0 | | |
| D | | DCTI | I0 | |
| E | | | DCTI | |

↑ Annul

Fig. 12

| Thread i State | 0 Ready | 1 Ready | 2 Wait | 3 Wait | 4 Wait | 5 Ready | 6 Ready |
|---|---|---|---|---|---|---|---|
| IB_Ti[1] | DCTI2 | I0 | I0 | | | Tgt DCTI1 | |
| IB_Ti[0] | DCTI1 | DCTI2 | DCTI2 | DCTI2 | DCTI2 | DCTI2 | Tgt DCTI1 |
| D | | DCTI1 | | | | | DCTI2 |
| E | | | DCTI1 | | | | |

↑ Cancel_Pick[i]　↑ Taken DCTI1　↑ WIBT[i]

Fig. 13

DELAY SLOT HANDLING IN A PROCESSOR

BACKGROUND

1. Field of the Invention

This invention is related to the field of processors and, more particularly, to handling of delay slots following control transfer instructions in processors.

2. Description of the Related Art

Some processor instruction set architectures (ISAs) define delayed control transfer instructions (DCTIs). A control transfer instruction may transfer program execution flow (either conditionally or unconditionally) to a target address. A DCTI transfers execution after the next instruction in the program flow (subsequent to the DCTI). The subsequent instruction is said to be in the delay slot of the DCTI, and is referred to herein as the "delay slot instruction". The delay slot instruction may be the next sequential instruction (stored adjacent to the DCTI in memory). In some ISAs (e.g. the SPARC® ISA), a DCTI may itself be the delay slot instruction of a previous DCTI in the program execution flow. If the previous DCTI is taken, the delay slot instruction of the DCTI in the delay slot of the previous DCTI is at the target of the previous DCTI. The order of instructions, if instructions were executed one at a time, is referred to as the program order of the instructions.

DCTIs and their delay slot instructions complicate processor design. For example, if a DCTI is taken (that is, it transfers program execution flow to the target address) and instructions from the not-taken (usually sequential) execution path have been fetched, the instructions need to be flushed from the processor and the instructions from the taken execution path need to be fetched. However, the delay slot instruction may not be flushed. Thus, the delay slot instruction must be located and preserved when a taken DCTI is executed. The delay slot instruction may generally be in many places (e.g. the fetch may not have been started yet, the fetch may be in progress and the delay slot instruction may be in the process of being returned from memory, the delay slot instruction may be on the way out of the instruction cache, or may be elsewhere in the pipeline of the processor). Accordingly, locating the delay slot instruction may generally be complex.

In some ISAs, such as the SPARC® V9 ISA, DCTIs may optionally annul their delay slot instructions. An annulled delay slot instruction is not executed. For example, in the SPARC® V9 ISA, conditional DCTIs that have an annul bit set in the instruction annul the delay slot instruction if the DCTI is not taken. Unconditional DCTIs that have an annul bit sit in the instruction always annul the delay slot instruction. Again, the delay slot instruction must be located so that the annul may occur.

In fine grain multithreaded processors, each instruction in the pipeline may be from a different thread than adjacent instructions in the pipeline. That is, for a given instruction is a given pipeline stage, instructions in a pipeline stage immediately before and after the given pipeline stage may be from different threads. Having instructions from multiple threads in the pipeline may further complicate locating the delay slot instruction.

SUMMARY

In one embodiment, a processor comprises a fetch unit and a pick unit. The fetch unit is configured to fetch instructions for execution by the processor. The pick unit is configured to schedule instructions fetched by the fetch unit for execution in the processor. The pick unit is configured to inhibit scheduling a delayed control transfer instruction (DCTI) until its delay slot instruction is available for scheduling.

In another embodiment, a processor comprises an instruction buffer and a circuit coupled thereto. The instruction buffer is configured to store instructions from a thread being executed by the processor. The circuit is configured to select instructions from the instruction buffer to issue for execution, and the circuit is configured to inhibit selection of a delayed control transfer instruction (DCTI) from the instruction buffer in response to an absence of a delay slot of the DCTI.

In yet another embodiment, a processor comprises a fetch unit and a pick unit coupled to the fetch unit. The pick unit is configured to select an instruction fetched by the fetch unit to issue for execution in the processor, wherein the pick unit is configured to inhibit selecting a delayed control transfer instruction (DCTI) until a delay slot instruction of the DCTI has been fetched by the fetch unit.

BRIEF DESCRIPTION OF THE DRAWINGS

The following detailed description makes reference to the accompanying drawings, which are now briefly described.

FIG. 3 is a pipeline diagram illustrating one embodiment of a pipeline that may be implemented by the core shown in FIG. 1.

FIG. 10 is a timing diagram illustrating one embodiment of stalling a DCTI in the instruction buffer until its delay slot instruction is written to the instruction buffer.

FIG. 11 is a timing diagram illustrating one embodiment of annulling a delay slot instruction in the instruction buffers.

FIG. 12 is a timing diagram illustrating one embodiment of annulling a delay slot instruction in the decode stage.

FIG. 13 is a timing diagram illustrating one embodiment of coupled DCTIs.

Figure 1:
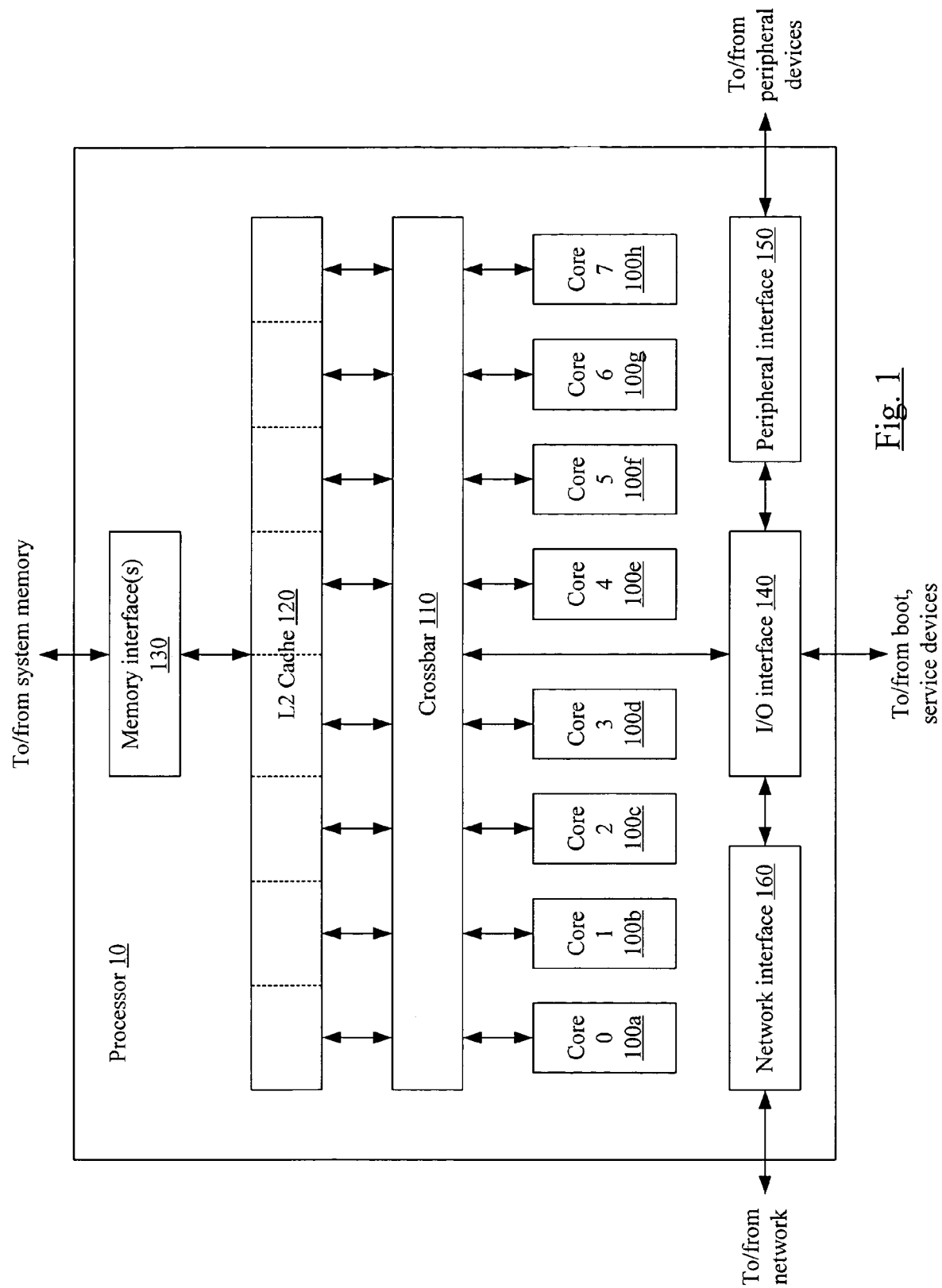
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview

Figure 2:
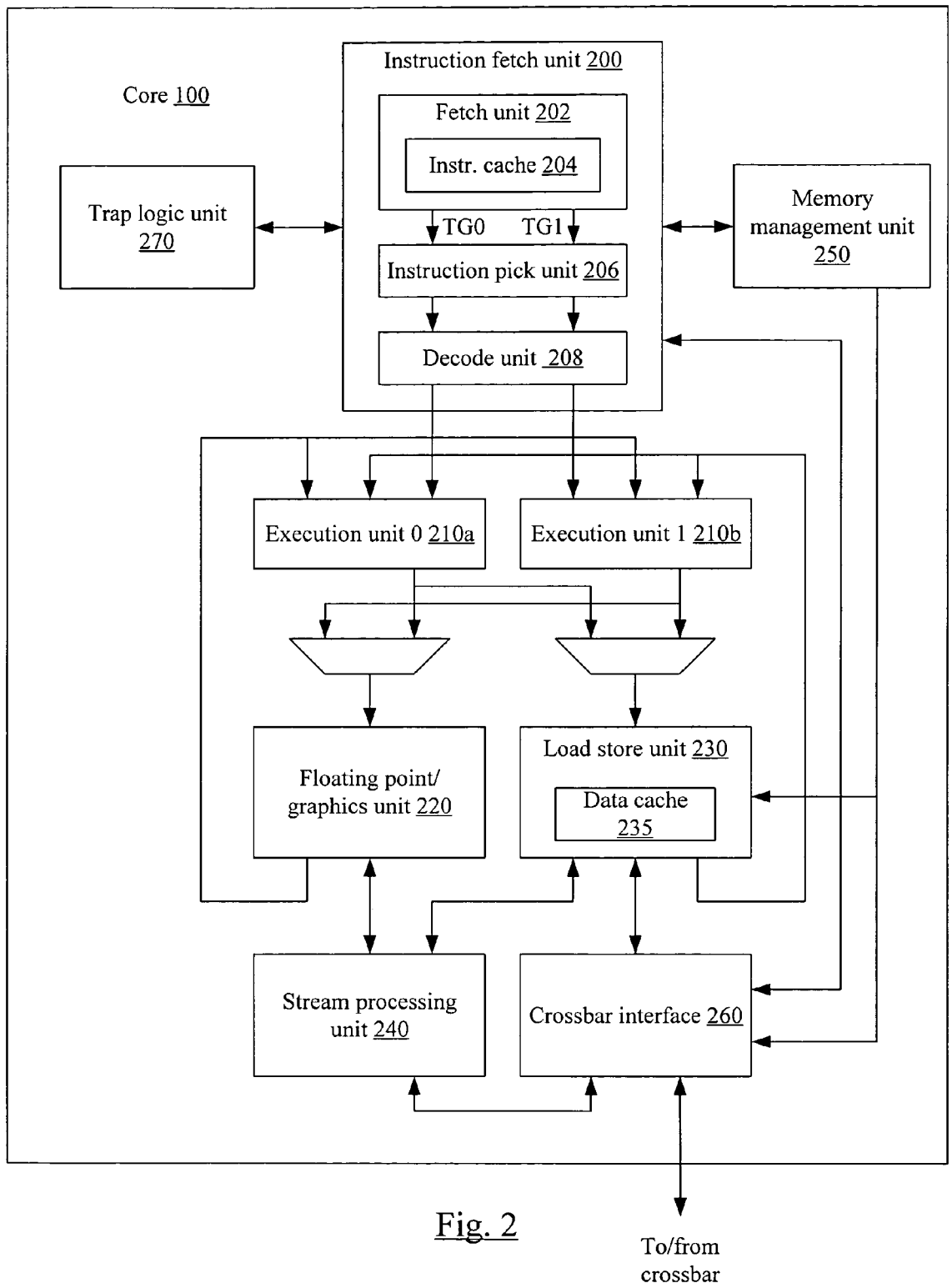
FIG. 2 is a block diagram of one embodiment of a core shown in FIG. 1.

FIGS. 1-3 present an overview of a multithreaded processor 10 that may implement the handling of a delay slot instruction as described in more detail below. In other embodiments, the processor may be implement other multithreaded or non-multithreaded configurations, as desired.

A block diagram illustrating one embodiment of a multithreaded processor 10 is shown in FIG. 1. In the illustrated embodiment, processor 10 includes a plurality of processor cores 100a-h, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requestors.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical mediabased storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI-Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI-Express.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210*a-b*. (Execution units 210*a-b* may also be referred to generically as EXUs 210.) Each of execution units 210*a-b* is coupled to both a floating point/graphics unit (FGU) 220 and a load store unit (LSU) 230. Each of the latter units is also coupled to send data back to each of execution units 210*a-b*. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 204 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with the IEEE 754 floating-point standard, such as add, subtract, multiply, divide, and certain transcendental functions. Also, in one embodiment FGU 220 may implement Single Instruction Multiple Data (SIMD) graphics-oriented instructions defined by a version of the SPARC Visual Instruction Set (VIS™) architecture, such as VIS 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requestors. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program) order complete or update architectural state.

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Delay Slot Handling

FIGS. 4-14 illustrate various embodiments for handling the delay slot instruction for embodiments of the processor 10 that implement an ISA specifying DCTIs. For example, in one embodiment, the SPARC ISA may be used. Other embodiments may implement any ISA that specifies DCTIs (e.g. the MIPS ISA).

Generally, the instruction pick unit 206 (or more briefly "pick unit 206") may be configured to select instructions from the plurality of active threads in the core 100 to issue for execution. Selecting instructions to issue for execution may also be referred to as scheduling instructions for execution. If a given thread has a DCTI to be selected, the pick unit 206 may inhibit selecting the DCTI, even if it is otherwise ready to be selected, until the delay slot instruction of the DCTI is available for selection by the pick unit 206. By inhibiting the selection of the DCTI until the delay slot instruction is available, the process of locating the delay slot instruction may be simplified, in some embodiments. The possible locations of the delay slot instruction, at the time the DCTI is executed, may be reduced as compared to implementations that select the DCTI without regard to the status of the delay slot instruction in some embodiments. Thus, annulling the delay slot instruction (if annulling is implemented) and preserving the delay slot instruction when a thread is flushed (e.g. due to a taken DCTI, in some embodiments) may be simplified, in some embodiments.

In various embodiments, instructions may be made available for selection/scheduling in different fashions. For example, instructions may be defined as available for selection/scheduling if the instructions have been successfully fetched by the fetch unit 202 and thus are provided to the pick unit 206 for consideration in scheduling decisions. In some embodiments, the fetch unit 202 or the pick unit 206 may implement one or more instruction buffers to store fetched instructions awaiting scheduling, and the instructions in the instruction buffers may be defined as available for selection/scheduling by the pick unit 206. In one particular embodiment, a separate instruction buffer may be implemented for each thread in the core 100. Other embodiments may have other configurations of buffers.

In one embodiment, the pick unit 206 selects instructions from a given thread in program order (that is, out of order selection is not performed). Such an embodiment is described in more detail below with regard to FIGS. 4-14. However, out of order embodiments are also contemplated and inhibiting selection of a DCTI until its delay slot instruction is available may be implemented in such embodiments. While a multi-threaded embodiment is described below, other embodiments may be single threaded and may still implement inhibiting selection of the DCTI unit its delay slot instruction is available.

Figure 4:
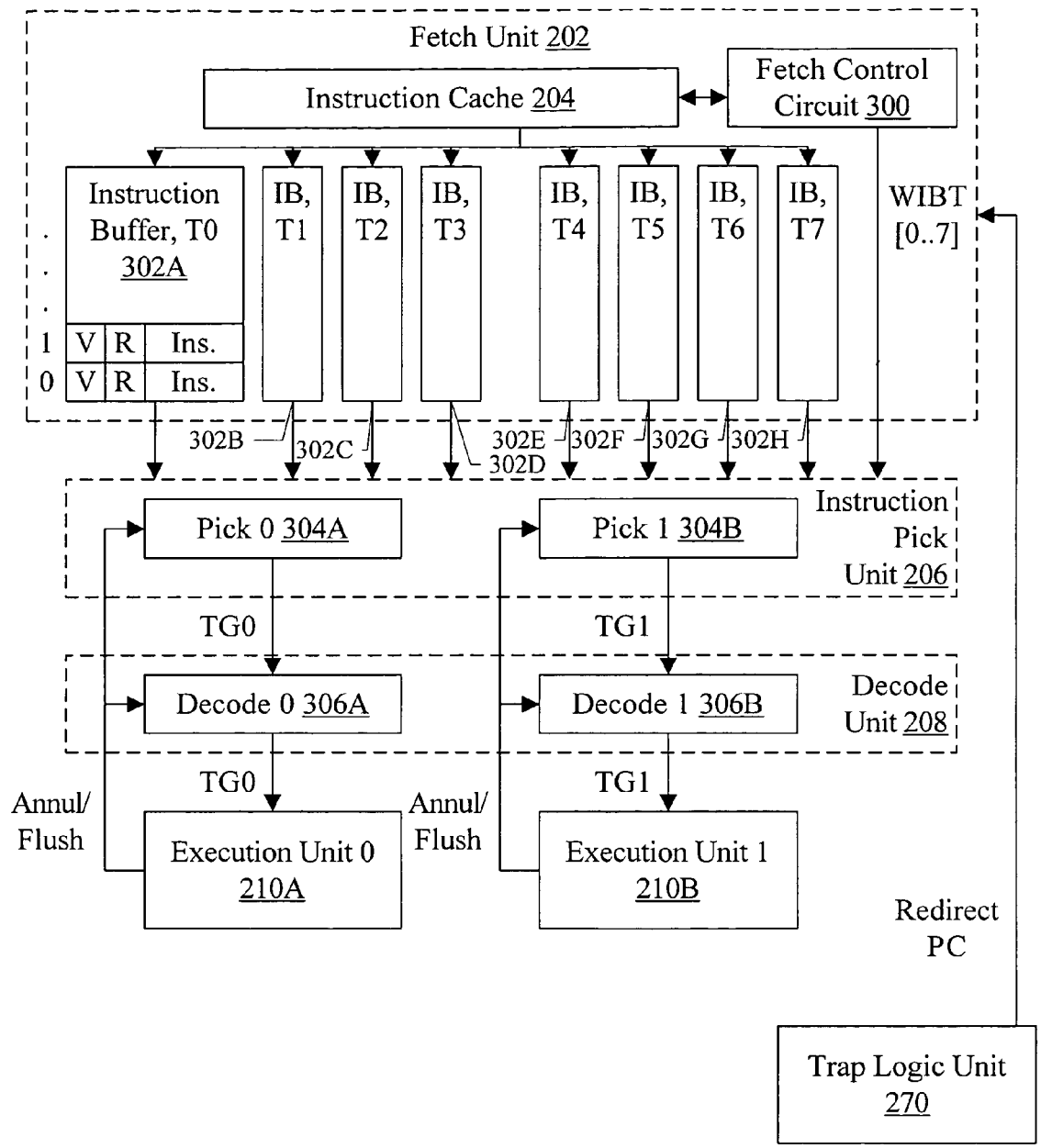
FIG. 4 is a block diagram illustrating one embodiment of a fetch unit, a pick unit, a decode unit, and execution units shown in FIG. 2.

Turning next to FIG. 4, one embodiment of a portion of the core 100 is shown. The fetch unit 202 is shown, including the instruction cache 204, a fetch control circuit 300, and a set of instruction buffers 302A-302H. In the illustrated embodiment, one instruction buffer 302A-302H is provided for each thread (e.g. 8 threads in this embodiment). Any number of threads may be supported in other embodiments. The fetch control circuit 300 is coupled to the instruction cache 204 and to provide a write instruction buffer indication for each thread (WIBT[0...7] in this embodiment, one signal for each thread 0 to 7). The instruction cache 204 is coupled to the instruction buffers 302A-302H. The pick unit 206 is shown, including pick circuits 304A and 304B (one for each thread group). Any number of pick circuits may be included in other embodiments. The pick unit 206 is coupled to the instruction buffers 302A-302H and the WIBT[0 ... 7] signals, in this embodiment. Decode unit 208 is shown and includes decode circuits 306A and 306B (one for each thread group). Any number of decode circuits may be included in other embodiments. The decode units 306A-306B are coupled to receive instructions from the respective pick circuits 304A-304B and to provide the decoded instructions to the execution units 210A-210B for execution. Execution units 210A-210B are also shown, and provide annul and flush indications (Annul/Flush in FIG. 4) to the respective pick circuits 304A-304B and decode units 306A-306B. The trap logic unit 270 is shown in FIG. 4, providing a redirect program counter (PC) to the fetch unit 202. Generally, a PC of an instruction is the address at which the instruction is stored (in either the virtual address space or the physical address space). Thus, the PC is used to fetch the instruction for execution and to locate the instruction in the event of exceptions.

Two entries of the instruction buffer 302A are shown in more detail in FIG. 4. Any number of entries may be provided in each instruction buffer 302A-302H (e.g. 8 entries in one embodiment). Other entries in the instruction buffer 302A and entries in other instruction buffers 302B-302H may be similar. Entries may also have more information than that shown in FIG. 4, as desired, and may represent the information shown in FIG. 4 in other fashions, as desired. In the illustrated embodiment, each entry includes storage for the instruction (Ins). Additionally, a valid bit (V) may be provided in each entry to indicate whether or not the instruction is valid in that entry. That is, the valid bit may indicate whether or not the entry is currently storing an instruction. For example, if the valid bit is set, the instruction may be valid and if the valid bit is clear, the instruction may not be valid. Other embodiments may reverse the set and clear states of the valid bit or use any other indication. Still further, an R bit is shown in each entry. The R bit may be used for a DCTI to override the inhibited selection of the DCTI when the delay slot instruction is not yet present. For example, if the R bit is set, the inhibit may be overridden and if the R bit is clear, the inhibit may not be overridden. Other embodiments may reverse the set and clear states of the R bit or use any other indication. Overriding the inhibit is described in more detail below.

The fetch control circuit 300 may be configured to control fetching of the plurality of threads in the instruction cache 204 (or from memory, in the event of an instruction cache miss). The fetch control circuit 300 may, e.g., maintain a fetch PC for each thread indicating the next PC to be fetched for the thread. The fetch control circuit 300 may select a PC from one of the threads for fetching each clock cycle. The fetch control circuit 300 may be redirected for a given thread by the trap logic unit 270 using the redirect PC in FIG. 4 for exceptions and other redirects, described in more detail below. In some embodiments, the trap logic unit 270 may also provide a PC for refetch on data cache misses (not shown in FIG. 4). The fetch control circuit 300 may also update the fetch PC of a thread due to a taken control transfer instruction. In one embodiment, the target PC of a taken CTI is provided by the execution units 210A-210B (path not shown in FIG. 4).

Instructions that are successfully fetched for a thread are written to the corresponding instruction buffer 302A-302H. The fetch control circuit 300 may indicate which instruction buffer(s) are being written in a given clock cycle using the WIBT[0 ... 7] signals. The WIBT[0 ... 7] signals may also serve as write controls to the respective instruction buffers 302A-302H, in some embodiments. Generally, the instruction buffers 302A-302H may each store the instructions for the corresponding thread in program order, with the oldest instruction (the instruction prior to each other instruction in the buffer in program order) in entry 0, the next oldest instruction in entry 1, etc. In some embodiments, each instruction buffer 302A-302H may comprise a single register storing entry 0 of the buffer (the oldest instruction in the buffer) and a memory array storing the remaining entries (with pointers indicating the oldest and youngest instructions in the memory array). As instructions are successfully issued for execution, the next instruction in program order may be read from the memory array and shifted into the register.

Each of the pick circuits 304A-304B may operate independently to select an instruction from the respective thread group to issue for execution. The operation of pick circuit 304A (and corresponding decode circuit 306A and execution unit 210A) is described in more detail below, and the operation of the pick circuit 304B (and corresponding decode circuit 306B and execution unit 210B) may be similar.

The pick circuit 304A selects a thread in thread group 0 (TG0) for scheduling, and attempts to schedule the instruction in entry 0 of the instruction buffer 302A-302D corresponding to the selected thread. In one embodiment, the pick circuit 304A may identify one or more threads in the thread group as "ready threads" and may select one of the ready threads (e.g. using the least recently picked algorithm mentioned above with regard to FIG. 2). The scheduled instruction is read from the corresponding instruction buffer 302A-302D and provided to the decode circuit 306A. As mentioned above with respect to FIG. 2, in some embodiments, the decode circuits 306A-306B may detect scheduling hazards between the thread groups and may cancel a scheduled instruction from one of the thread groups. If a cancellation does not occur, the scheduled, decoded instruction is provided to the execution unit 210A for execution.

If the instruction in entry 0 of the instruction buffer 302A-302D for a given thread is a DCTI, the pick circuit 304A may inhibit scheduling the DCTI if the delay slot instruction is absent from the instruction buffer. For example, if the instruction in entry 1 of the instruction buffer 302A-302D for that thread is not valid, the DCTI may not be scheduled.

In some embodiments, even if the instruction in entry 1 is valid, it is not certain that the instruction is the delay slot instruction of the DCTI. For example, if a given DCTI is the delay slot instruction of a previously scheduled DCTI and the previously scheduled DCTI is taken, the delay slot instruction of the given DCTI is at the target of the previously scheduled DCTI and may not be in the instruction buffer 302A-302D until after the previously scheduled DCTI has executed. To handle this case, the pick circuit 304A may not schedule the given DCTI if a DCTI for the same thread is in the decode circuit 306A or the execution unit 210A.

Accordingly, in the embodiment of FIG. 4, if the execution of a DCTI results in an annul of its delay slot instruction, the delay slot instruction is either found in the corresponding decode circuit 306A (if the delay slot instruction was scheduled the clock cycle after the DCTI was scheduled) or in entry 0 of the instruction buffer 302A-302D corresponding to the thread. Accordingly, the execution unit 210A may provide an annul indication to the decode circuit 306A and the pick circuit 304A. The annul indication may indicate whether or not an annul is occurring, and may identify the thread for which the annul is occurring. If the instruction in the decode circuit 306A is in the same thread as indicated by the annul indication, the instruction is annulled by the decode circuit 306A. If the instruction in the decode circuit 306A is not in the same thread as indicated by the annul indication (or there is no instruction in the D stage when an annul is signalled by the execution unit 210A), the instruction in entry 0 of the instruction buffer 302A-302D corresponding to the thread is annulled by the pick circuit 304A. In other embodiments, if additional pipeline stages are implemented between the pick unit 206 and the execution units 210A-210B, the delay slot instruction may be in one of the pipeline stages between the pick unit 206 and the execution units 210A-210B or in the instruction buffer 302A-302D of the thread, in entry 0.

In the embodiment of FIG. 4, if a DCTI is taken (causing a flush in this embodiment, since threads fetch sequentially until redirected in this embodiment), the execution unit 210A may signal a flush and identify the thread. In a fashion similar to the annul described above, the delay slot instruction may be located in either decode circuit 306A or entry 0 of corresponding instruction buffer 302A-302D to preserve the delay slot instruction while other instructions in the thread are flushed.

While inhibiting scheduling of a DCTI until its delay slot instruction is available may generally be performed in the present embodiment, there may be cases in which overriding the inhibit is desirable. For example, in the SPARC ISA, a retry instruction is defined. The retry instruction is typically used at the end of an exception handler routine, to reattempt the execution of an instruction that experienced an exception. Since the SPARC ISA implements delay slot instructions, an exception on the delay slot instruction results in executing the delay slot instruction followed by the instruction at the target of the DCTI, if the DCTI is taken. Accordingly, the retry instruction provides both a PC target and a next PC (NPC) target to identify the first two instructions to be fetched.

The embodiment of FIG. 4 may handle the retry instruction by first redirecting the thread to the PC target of the retry instruction, specifying that only one instruction is fetched. After that instruction has completed, the thread may be redirected to the NPC target of the retry instruction. The redirects may be handled by the trap logic unit 270 in this embodiment, using the redirect PC to the fetch unit 202. The redirect PC may specify the PC to be fetched and the thread that is being redirected. Additionally, the trap logic unit 270 may indicate whether or not only one instruction is to be fetched at the redirect PC.

If the instruction at the PC target of the retry instruction is a DCTI that: is in the delay slot of a previous DCTI; is taken; and does not annul its delay slot; then an additional single instruction redirect occurs at the target of the previous DCTI, followed by a redirect to the target of the DCTI. The trap logic unit 270 may use the same mechanism described above to initiate another single cycle redirect at the NPC target of the retry instruction (the target of the previous DCTI) to be followed by a redirect to the target of the DCTI on which the exception occurred. As long as the instructions fetched in this fashion continue to be taken DCTIs that do not annul, the trap logic unit 270 may continue initiating single instruction redirects until either a non-DCTI instruction is executed, a DCTI that is not taken is executed, or a DCTI that annuls its delay slot is executed. At the end of a sequence of taken, non-annulling DCTIs, if a non-DCTI instruction or a not taken DCTI is executed, fetch is redirected to the target of the last taken DCTI and the redirect is not indicated as a single instruction redirect. If the DCTI annuls its delay slot and is taken, fetch is redirected to the target of the DCTI and the redirect is not indicated as a single instruction redirect. If the DCTI annuls its delay slot and is not taken, fetch is redirected to the target of the last taken DCTI plus one instruction (to annul the delay slot instruction) and the redirect is not indicated as a single instruction redirect.

The fetch unit may set the R bit in the instruction buffer when fetching the one instruction of a single instruction redirect. Thus, if the instruction in a single instruction redirect is a DCTI, the pick circuit 304A overrides the inhibit to scheduling the DCTI. Since only one instruction is fetched, the DCTI would not be scheduled if the inhibit were not overridden. In other embodiments, other reasons for overriding the inhibit may occur. In still other embodiments, overriding may not be implemented (e.g. the single instruction fetch may be implemented in another way, such as inserting a noop in the single instruction fetch case).

Another case in which the delay slot instruction may not be delivered is if there is an exception or other error when attempting to fetch the delay slot instruction. For example, there may be no valid translation for the delay slot instruction's PC, if virtual addressing is used. If the delay slot instruction is fetched from memory and error checking/correction (ECC) codes or parity are used to protect the memory, an uncorrectable error may be detected. Similarly, an uncorrectable error may be detected in the instruction cache during a fetch. In such cases, the fetch unit 202 may generate at least one no-operation (noop) instruction and insert the noop instruction into the corresponding instruction buffer 302A-302D in place of the delay slot instruction. The noop instruction may be used to carry the exception down the pipeline to the trap logic unit 270, which may take the exception. Since it is possible for the noop instruction in the delay slot to be annulled on execution of the DCTI in this embodiment, the fetch unit 202 may generate a pair of noop instructions. Embodiments which do not implement annuls may generate only one noop instruction.

In one embodiment, the pick circuit 304A may implement a respective state machine for each thread in the thread group. The state machine may include a ready state (indicating that the pick circuit 304A may select the thread for picking this cycle) and a wait state (indicating that the pick circuit 304A may not select the thread for picking this cycle). Thus, a "ready thread" as described above may be a thread for which the corresponding state machine is in the ready state. In some cases, a thread may not be ready even if the thread is in a ready state (e.g. if conditions occur that make the thread not ready that may not be accounted for in a state change to the wait state). In such situations, if the thread is selected for picking, the pick may be cancelled for that clock cycle.

Accordingly, the pick circuit 304A may inhibit scheduling a DCTI instruction in a thread using a combination of the wait state for the thread's state machine and cancelling pick, in this embodiment. That is, scheduling is inhibited if the thread's state machine is in the wait state, or if the thread's state machine is in the ready state but the pick is cancelled. It may be desirable to transition to the wait state as frequently as possible to inhibit scheduling, since the pick circuit 304A may schedule an instruction from another ready thread in the thread group if the state machine is in the wait state to inhibit scheduling the DCTI.

Figure 5:
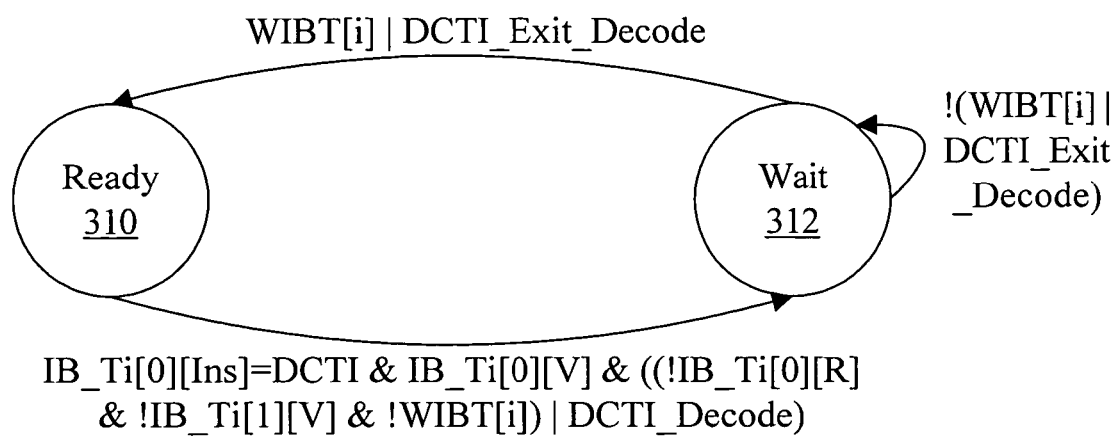
FIG. 5 is a block diagram of one embodiment of a state machine indicating whether or not a thread is ready to be picked and one embodiment of a cancel pick equation.

FIG. 5 is a block diagram of one embodiment of a state machine for a thread (thread i) and a corresponding cancel pick equation (Cancel_Pick[i]). The embodiment of FIG. 5 illustrates state transitions and pick cancellation related to inhibiting DCTI scheduling. Other state transitions, states, and/or pick cancellations may be implemented, in general, to handle other selection hazards. The state machine includes a ready state 310 and a wait state 312.

In FIG. 5, certain notation is used. An entry in the instruction buffer corresponding to thread i is noted as IB_Ti followed by a bracketed number and a bracketed letter or letters. The number is the entry number in the instruction buffer, and the letter(s) refers to a field in the entry (e.g. valid bit V, override bit R, and the Ins field). Thus, the valid bit of entry 0 in the instruction buffer of thread i is denoted as IB_Ti[0][V]. Logical AND is denoted with an "&", and logical OR is denoted with "|". Logical NOT is denoted with a "!". Other notations will be described as used.

Generally, if thread i is in the ready state 310 and a DCTI is detected in entry zero of the thread's instruction buffer ("IB_Ti[0][Ins]=DCTI" in FIG. 5) and the instruction is valid (IB_Ti[0][V], the thread state machine may transition to the wait state 312 if one of two conditions in this embodiment: the instruction in the thread's instruction buffer entry 1 is not valid (!IB_Ti[1][V]) and the DCTI in entry 0 does not override the inhibit (!IB_Ti[0][R]); or another DCTI from the same thread is in the decode stage (DCTI_Decode). The first condition inhibits scheduling of the DCTI if the delay slot instruction is not in the instruction buffer, and the second condition inhibits scheduling if the DCTI in entry 0 is itself in the delay slot of a DCTI that was previously scheduled. The first condition is also qualified, in this case, with a write to the thread's instruction buffer (!WIBT[i]). If a write to the thread's instruction buffer is occurring, the delay slot instruction of the DCTI is being delivered and thus the DCTI may be selected in the next clock cycle. Accordingly, transition to the wait state is prevented if the write is occurring (although the pick is also cancelled, as discussed in the cancel pick equation below).

The state machine transitions from the wait state 312 to the ready state 310 if a write to the thread's instruction buffer is occurring (WIBT[i]) or if a DCTI from the same thread is exiting decode (DCTI_Exit_Decode). The transition due to the write being performed satisfies the first condition described above, and the DCTI exiting decode satisfies the second condition. If neither the write to the thread's instruction buffer is occurring nor the DCTI exiting decode, the state machine remains in the wait state 312. Other cases may also cause the state machine to exit the wait state 312 (e.g. a flush of the thread).

Additionally, as mentioned above, in some cases the state machine may be in the ready state, but the instruction in the thread's instruction buffer is not ready to be scheduled. The Cancel_Pick[i] equation may ensure that the instruction is not scheduled in such a case. For example, in the case that a DCTI is in the thread's instruction buffer entry 0 and is valid, the DCTI is not ready for issue if one of three conditions applies in this embodiment: the instruction at buffer entry 1 is not valid (!IB_Ti[1][V]) and the override of the inhibit is not indicated for the DCTI (!IB_Ti[0][R]); the instruction at decode is a DCTI from the same thread (DCTI_Decode); or the instruction at execute is a DCTI from the same thread (DCTI_Execute). In the case that the DCTI from the same thread is at execute, transitioning to the wait state may not be performed because any flushing/annulling due to the DCTI at execute may occur this clock cycle, and thus the DCTI in instruction buffer entry 0 may be schedulable in the next clock cycle.

Figure 6:
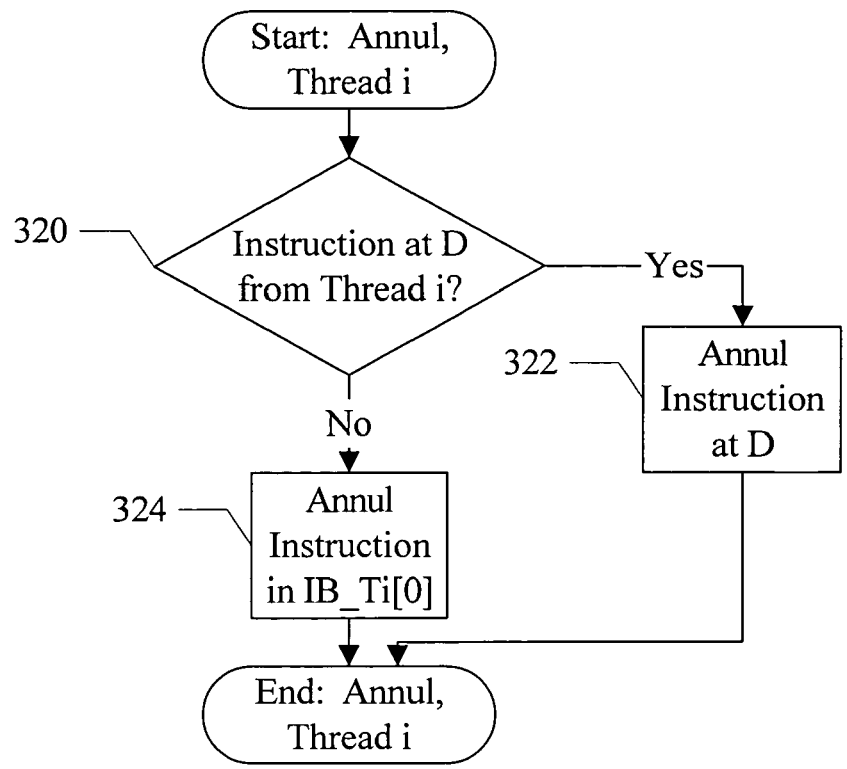
FIG. 6 is a flowchart illustrating one embodiment of annulling a delay slot instruction for a thread.

Operation of one embodiment of the decode circuit 306A and the pick circuit 304A for annulling a delay slot instruction in a thread i is shown in the flowchart of FIG. 6. That is, the decode circuit 306A and the pick circuit 304A may include circuitry that implements the operation shown in FIG. 6. The flowchart of FIG. 6 may be performed in response to an annul indication from the execution unit 210A that identifies thread i. If the instruction in the decode circuit 306A is from thread i (decision block 320, "yes" leg), the instruction is annulled by the decode circuit 306A (block 322). For example, the instruction may be cancelled and thus not propagate beyond the decode stage. If the instruction in the decode circuit 306A is not from thread i (or there is no instruction in the D stage when an annul is signalled by the execution unit 210A—decision block 320, "no" leg), the instruction in entry 0 of the instruction buffer 302A-302D corresponding to thread i (IB_Ti[0]) is annulled by the pick circuit 304A (block 324). For example, the valid bit in entry zero may be cleared.

Figure 7:
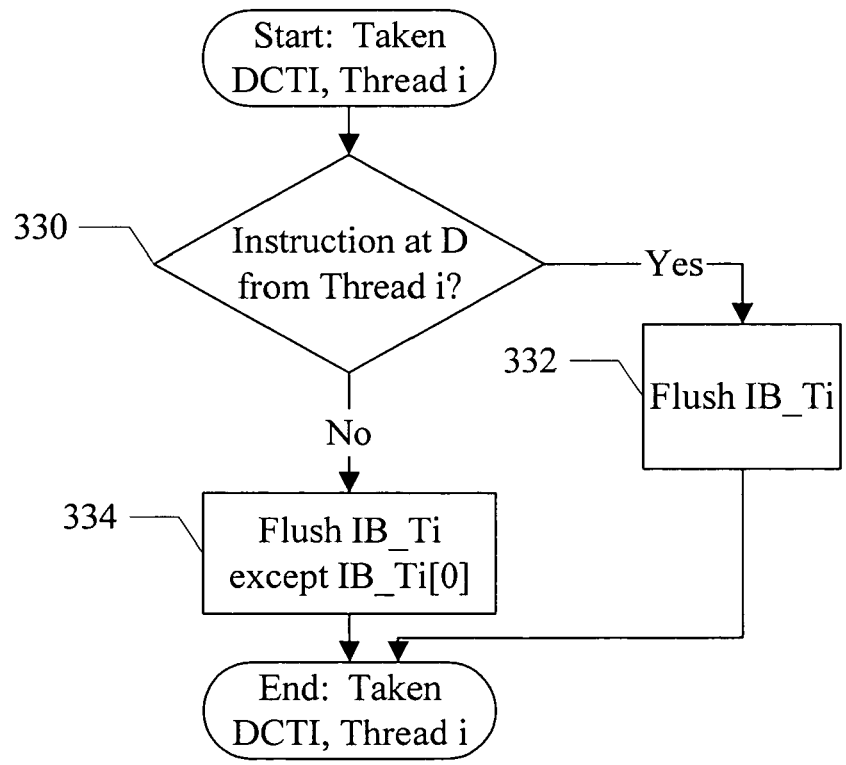
FIG. 7 is a flowchart illustrating one embodiment of flushing a thread in response to a taken DCTI.

FIG. 7 is a flowchart illustrating operation of one embodiment of the decode circuit 306A and the pick circuit 304A for flushing a thread while preserving the delay slot instruction. That is, the decode circuit 306A and the pick circuit 304A may include circuitry that implements the operation shown in FIG. 7. If the instruction in the decode circuit 306A is from thread i (decision block 330, "yes" leg), the instruction in decode is the delay slot instruction. Accordingly, the thread's instruction buffer is flushed (including entry zero) (block 332). For example, the valid bit in each entry of the buffer may be cleared. If the instruction in the decode circuit 306A is not from thread i (or there is no instruction in the D stage when an annul is signalled by the execution unit 210A—decision block 330, "no" leg), the instruction in entry 0 of the instruction buffer 302A-302D corresponding to thread i (IB_Ti[0]) is the delay slot instruction. Accordingly, the instruction buffer is flushed except for entry 0 (block 334). For example, the valid bit in each entry except for entry zero may be cleared.

The present description generally refers to identifying threads corresponding to instructions, instructions being from the same thread, etc. Any mechanism for identifying which thread an instruction belongs to may be used. For example, a thread tag or other value may be assigned to each thread that uniquely identifies the thread, and the thread tags of instructions may be compared.

Figure 8:
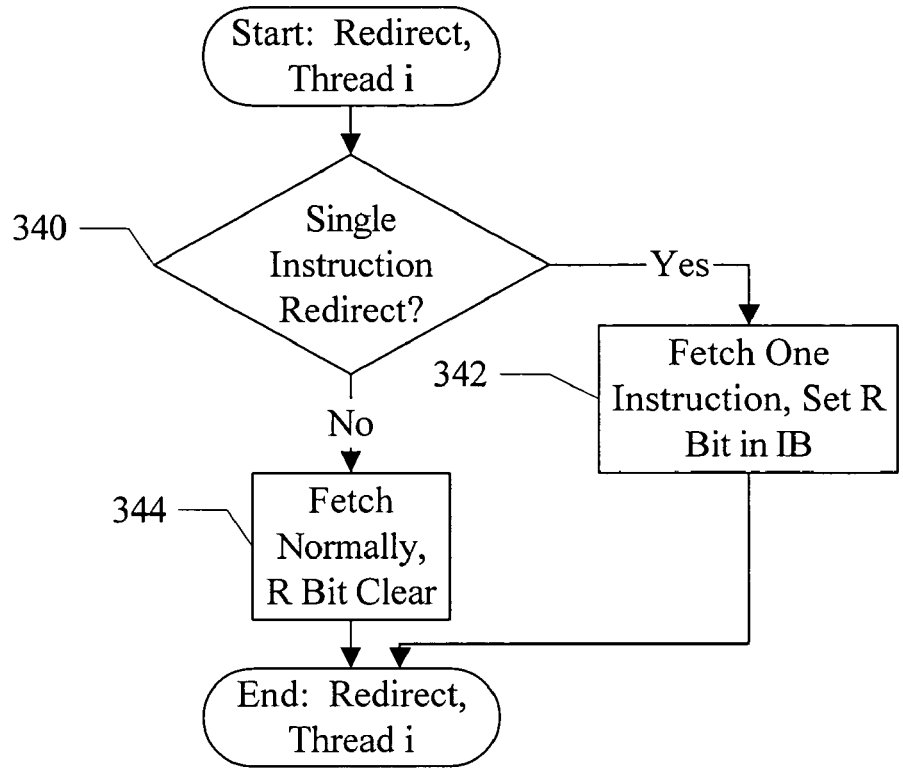
FIG. 8 is a flowchart illustrating one embodiment of redirecting a thread.

FIG. 8 is a flowchart illustrating operation of one embodiment of the trap logic unit 270 and the fetch control circuit 300 for redirecting thread i. That is, the trap logic unit 270 and the fetch control circuit 300 may include circuitry that implements the operation shown in FIG. 8. If the redirect is a single instruction redirect, such as the first redirect of a retry instruction or a subsequent redirect due to a taken DCTI that does not annul and is in the delay slot of a previous DCTI (decision block 340, "yes" leg), the trap logic unit 270 may signal the fetch control circuit 300 to fetch only one instruction from the redirect address. The fetch control circuit 300 may set the R bit in the instruction buffer for thread i when writing the instruction to the instruction buffer (block 342). If the redirect is not a single instruction redirect (decision block 340, "no" leg), the trap logic unit 270 may signal the fetch control circuit 300 to fetch normally from the redirect address. The fetch control circuit 300 may clear the R bit in the instruction buffer for thread i when writing the instruction to the instruction buffer (block 344).

Figure 9:
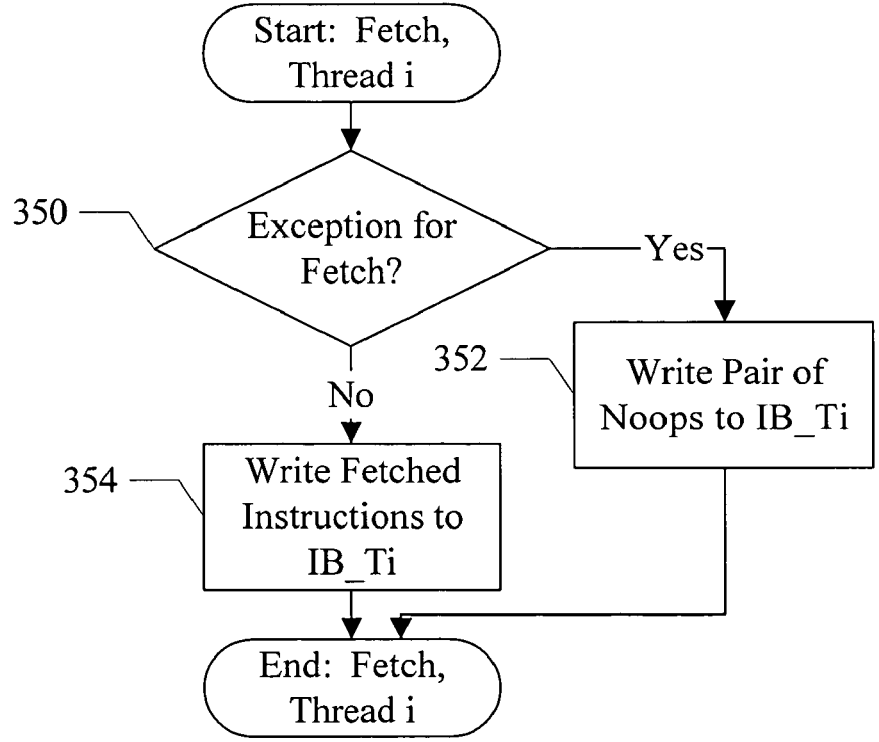
FIG. 9 is a flowchart illustrating one embodiment of fetching a thread.

FIG. 9 is a flowchart illustrating operation of one embodiment of the fetch control circuit 300 for a fetch for thread i. That is, the fetch control circuit 300 may include circuitry that implements the operation shown in FIG. 9. If there is an exception or other error on the fetch (decision block 350, "yes" leg), the fetch control circuit 300 may generate a pair of noop instructions and write the pair of noop instructions to the instruction buffer for thread i (IB_Ti—block 352). If there is no exception/error (decision block 350, "no" leg), the fetch control circuit 300 may write the fetched instructions to the instruction buffer for thread i (block 354).

FIGS. 10-14 are timing diagrams illustrating exemplary operation of the core 100 for DCTI instructions. Clock cycles are delimited by vertical lines in FIGS. 10-14, and the clock cycles are labeled at the top for reference (0, 1, 2, etc.). The thread state is illustrated at each clock cycle for the thread, along with entries 1 and 0 of the instruction buffer and the instruction at the decode stage (D) and the execute stage (E), if the instructions are from the same thread (thread i).

FIG. 10 is a timing diagram of an example in which the scheduling of a DCTI is delayed until the delay slot instruction is provided. In clock cycle 0, an instruction J0 is in entry 0 of the instruction buffer. The thread state is ready, and instruction I0 is selected for issue. In clock cycle 1, the DCTI appears in entry 0 of the instruction buffer, but the delay slot instruction is not yet in entry 1. The state machine is still in the ready state, but the pick is cancelled due to the presence of a DCTI in entry 0 and absence of a valid instruction in entry 1 (Cancel_Pick[i] asserted near the end of clock cycle 1). Accordingly, scheduling of the DCTI is not performed in clock cycle 1. The instruction I0 has progressed to the D stage.

In clock cycle 2, the state machine has transitioned to the wait state, again due to the presence of a DCTI in entry 0 and absence of a valid instruction in entry 1. In clock cycle 3, the state machine remains in the wait state. Thus, scheduling of the DCTI is inhibited in clock cycles 2 and 3. Since the thread is in the wait state in clock cycles 2 and 3, if another thread in the thread group is in the ready state, the pick circuit 204A may schedule an instruction from one of those other threads (not shown in FIG. 10). In clock cycle 3, a write to the instruction buffer is indicated (WIBT[i] asserted), causing a transition of the state machine to the ready state in clock cycle 4.

In clock cycle 4, the delay slot instruction I1 is in entry 1 of the instruction buffer and the state machine is in the ready state. In this example, the DCTI is scheduled in clock cycle 4, and thus progresses to the D stage in clock cycle 5. The delay slot instruction is scheduled in clock cycle 5.

FIG. 11 is a timing diagram illustrating an example in which the DCTI annuls its delay slot instruction (instruction I0 in this example) while the delay slot instruction is in the instruction buffer (entry 0). In clock cycle 0, the DCTI is selected and progresses to the E stage in clock cycle 2. While the delay slot instruction I0 is eligible for scheduling in clock cycle 1, it is not selected (e.g. an instruction from another thread may be selected). In clock cycle 2, the execution unit 210A transmits the annul indication, annulling the delay slot instruction I0. Thus, in clock cycle 3, the instruction I0 is absent from the instruction buffer and the decode stage.

FIG. 12 is a timing diagram illustrating an example in which the DCTI annuls its delay slot instruction (instruction I0 in this example) while the delay slot instruction is in the decode stage. In clock cycle 0, the DCTI is selected and progresses to the E stage in clock cycle 2. The delay slot instruction I0 is eligible for scheduling in clock cycle 1, and is also selected and progresses to the D stage in clock cycle 2. In clock cycle 2, the execution unit 210A transmits the annul indication, annulling the delay slot instruction I0. Thus, in clock cycle 3, the instruction I0 is absent from the E stage.

FIG. 13 is a timing diagram of an example in which the scheduling of a DCTI is delayed because it is the delay slot instruction of a previously scheduled DCTI. In clock cycle 0, DCTI1 is in entry 0 of the instruction buffer and DCTI2 is in entry 1. The thread state is ready, and DCTI1 is selected for issue. In clock cycle 1, DCTI2 appears in entry 0 of the instruction buffer and DCTI1 has progressed to decode. An instruction I0 is in entry 1. The state machine is still in the ready state, but the pick is cancelled due to the presence of DCTI1 in decode and DCTI2 in entry 0 of the instruction buffer (Cancel_Pick[i] asserted near the end of clock cycle 1). Accordingly, scheduling of DCTI2 is not performed in clock cycle 1, even though a valid instruction is in entry 1 of the instruction buffer.

In clock cycle 2, the state machine has transitioned to the wait state, again due to DCTI1 at decode and DCTI2 in entry 0 in clock cycle 1. Accordingly, scheduling of DCTI2 is not performed in clock cycle 2. Also in clock cycle 2, DCTI1 is in execute and is determined to be taken. The taken DCTI causes a flush of the instruction I0 from entry 1 of the instruction buffer, and the target of DCTI1 is fetched. Accordingly, in clock cycle 3, the instruction I0 is no longer in the instruction buffer.

The state machine remains in the wait state in clock cycles 3 and 4. Thus, scheduling of DCTI2 is inhibited in clock cycles 3 and 4. Since the thread is in the wait state in clock cycles 2, 3, and 4, if another thread in the thread group is in the ready state, the pick circuit 204A may schedule an instruction from one of those other threads (not shown in FIG. 13). In clock cycle 4, a write to the instruction buffer is indicated (WIBT[i] asserted), causing a transition of the state machine to the ready state in clock cycle 5.

In clock cycle 5, the delay slot instruction (the target of DCTI1) is in entry 1 of the instruction buffer and the state machine is in the ready state. In this example, DCTI2 is scheduled in clock cycle 5, and thus progresses to the D stage in clock cycle 6. As FIG. 13 illustrates, inhibiting scheduling of DCTI2 while DCTI1 executes permits the correct delay slot instruction for DCTI2 to be placed into the instruction buffer prior to scheduling DCTI2.

Figure 14:
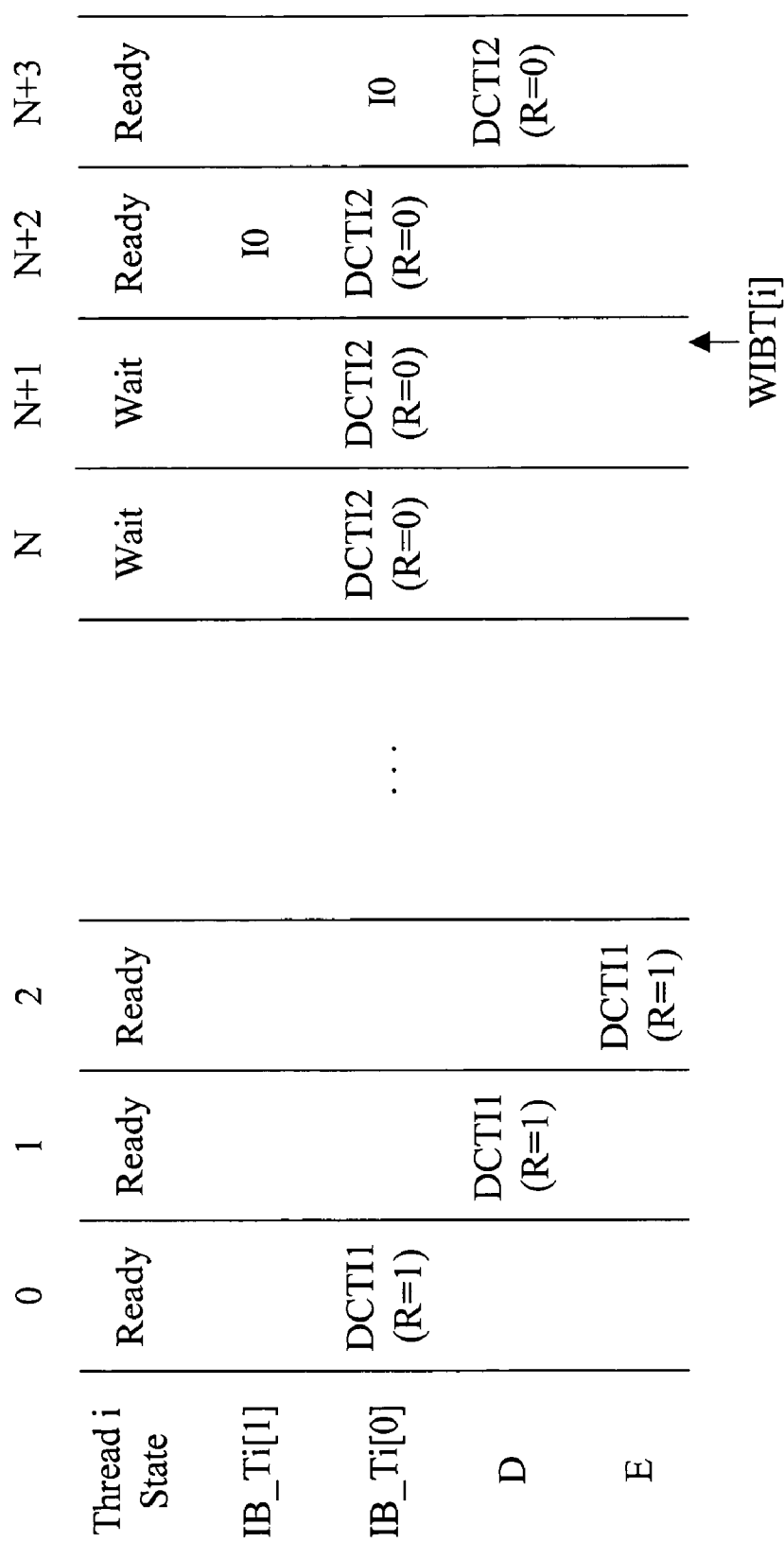
FIG. 14 is a timing diagram illustrating one embodiment of fetching targets of a retry instruction.

FIG. 14 illustrates an example use of the R bit to override inhibiting selection of a DCTI when it is the first target of a retry instruction. Clock cycles 0 to 2 illustrate the issue of the DCTI1, with the R bit set, even though no other instructions are in the buffer. Subsequently, clock cycles N to N+3 illustrates the inhibiting of another DCTI, DCTI2, at the second target of the retry instruction. Clock cycles N to N+3 are similar to clock cycles 2-5 in FIG. 10.

Exemplary System Embodiment

Figure 15:
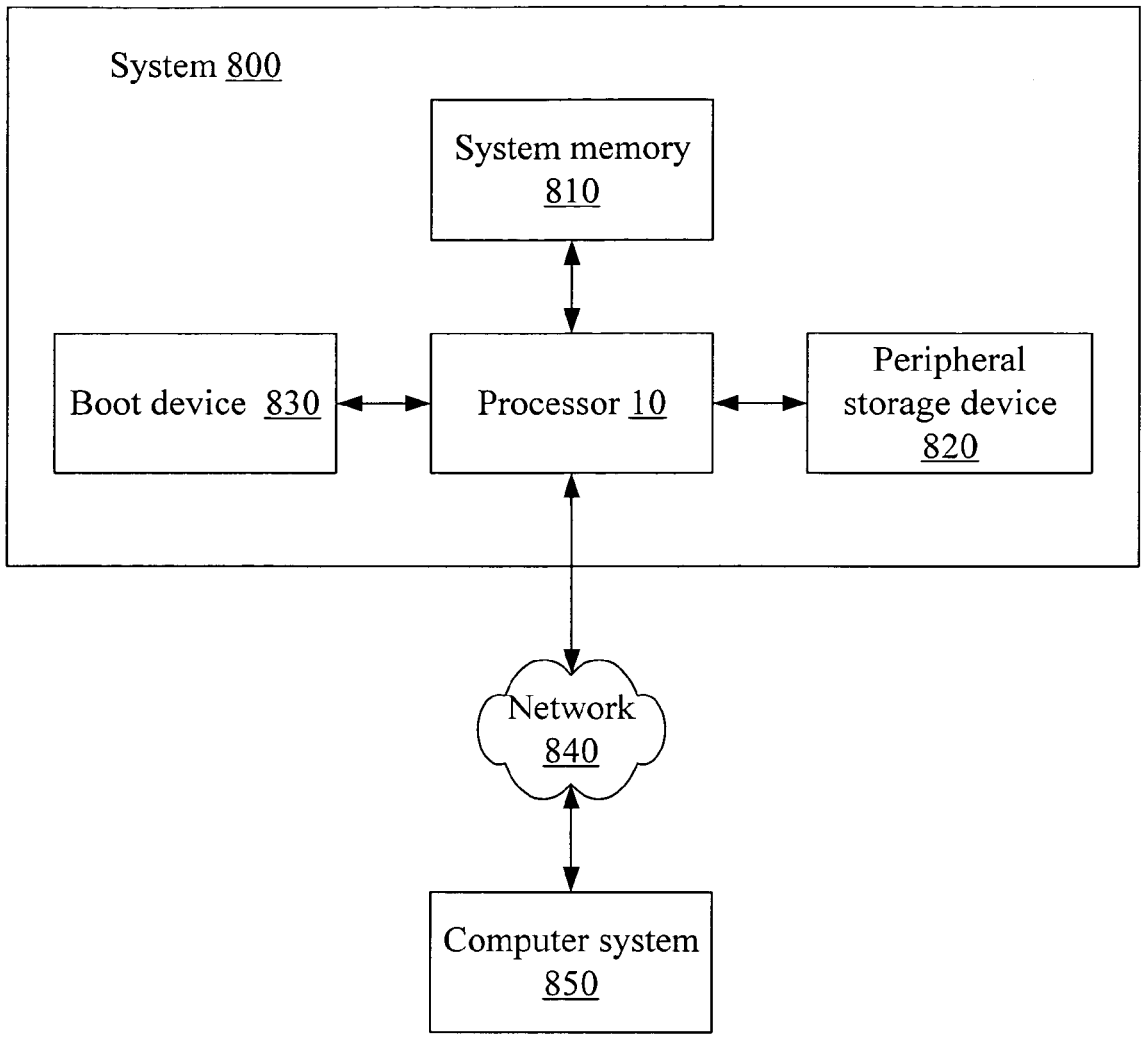
FIG. 15 is a block diagram of one embodiment of a computer system including the processor shown in FIG. 1.

As described above, in some embodiments processor 10 of FIG. 1 may be configured to interface with a number of external devices. One embodiment of a system including processor 10 is illustrated in FIG. 15. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire®

(IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Numerous variations and modifications will become apparent to those skilled in the art once the above disclosure is fully appreciated. It is intended that the following claims be interpreted to embrace all such variations and modifications.

What is claimed is:

1. A processor comprising:
   an instruction buffer configured to store instructions from a thread being executed by the processor; and
   a circuit coupled to the instruction buffer, wherein the circuit is configured to select instructions from the instruction buffer to issue for execution, and wherein the circuit is configured to inhibit selection of a delayed control transfer instruction (DCTI) from the instruction buffer in response to an absence of a delay slot instruction of the DCTI.

2. The processor as recited in claim 1 wherein the circuit is configured to permit selection of the DCTI in response to a presence of the delay slot instruction in the instruction buffer.

3. The processor as recited in claim 2 further comprising a fetch circuit coupled to the instruction buffer, wherein the fetch circuit is configured to fetch the delay slot instruction and, if an exception occurs for the fetch of the delay slot instruction, the fetch circuit is configured to insert at least one no-operation (noop) instruction into the instruction buffer in place of the delay slot instruction.

4. The processor as recited in claim 3 wherein the fetch circuit is configured to insert a pair of noop instructions into the instruction buffer.

5. The processor as recited in claim 1 wherein the instruction buffer is further configured to store an indication corresponding to the DCTI, wherein the indication is indicative of whether or not the DCTI is selectable even if the delay slot instruction is absent from the instruction buffer, and wherein the circuit is configured to override the inhibit responsive to the indication indicating that the DCTI is selectable.

6. The processor as recited in claim 1 wherein, if a second DCTI was previously issued from the instruction buffer and the DCTI in the instruction buffer is the delay slot instruction of the second DCTI, the circuit is configured to inhibit selection of the DCTI to issue until the second DCTI has executed.

7. The processor as recited in claim 1 further comprising a plurality of instruction buffers including the instruction buffer, and wherein each of the plurality of instruction buffers is configured to store instructions from a different thread being concurrently executed in the processor, and wherein the circuit is coupled to the plurality of instruction buffers and is configured to select an instruction from at least one of the instruction buffers to issue for execution.

8. A method comprising:
   storing instructions from a thread being executed by a processor in an instruction buffer of the processor; and
   inhibiting selection of a delayed control transfer instruction (DCTI) from the instruction buffer to issue for execution in response to an absence of a delay slot instruction corresponding to the DCTI from the instruction buffer.

9. The method as recited in claim 8 further comprising permitting selection of the DCTI in response to a presence of the delay slot instruction in the instruction buffer.

10. The method as recited in claim 9 further comprising:
    fetching the delay slot instruction;
    detecting an exception for the fetch of the delay slot instruction; and
    inserting at least one no-operation (noop) instruction into the instruction buffer in place of the delay slot instruction.

11. The method as recited in claim 10 wherein the inserting comprises inserting a pair of noop instructions into the instruction buffer.

12. The method as recited in claim 8 further comprising:
    storing an indication corresponding to the DCTI in the instruction buffer, wherein the indication is indicative of whether or not the DCTI is selectable even if the delay slot instruction is absent from the instruction buffer; and
    overriding the inhibiting responsive to the indication indicating that the DCTI is selectable.

13. The method as recited in claim 8 further comprising, if a second DCTI was previously issued from the instruction buffer and the DCTI in the instruction buffer is the delay slot instruction of the second DCTI, inhibiting selection of the DCTI until the second DCTI has executed.

14. The method as recited in claim 8 wherein the processor includes a plurality of instruction buffers including the instruction buffer, and wherein each of the plurality of instruction buffers is configured to store instructions from a different thread being concurrently executed in the processor, the method further comprising selecting an instruction from at least one of the instruction buffers to issue for execution.

15. A processor comprising:
    a fetch unit configured to fetch instructions for execution by the processor; and
    a pick unit coupled to the fetch unit and configured to select an instruction fetched by the fetch unit to issue for execution in the processor, wherein the pick unit is configured to inhibit selecting a delayed control transfer instruction (DCTI) until a delay slot instruction of the DCTI has been fetched by the fetch unit.

16. The processor as recited in claim 15 wherein the pick unit is configured to select the DCTI in response to the delay slot instruction having been fetched by the fetch unit.

17. The processor as recited in claim 16 wherein the fetch unit is configured, if an exception occurs for the fetch of the delay slot instruction, to generate at least one no-operation (noop) instruction in place of the delay slot instruction.

18. The processor as recited in claim 17 wherein the fetch unit is configured to generate a pair of noop instructions.

19. The processor as recited in claim 15 wherein, if a second DCTI was previously issued and the DCTI is the delay slot instruction of the second DCTI, the pick unit is configured to inhibit selection of the DCTI until the second DCTI has executed.

20. The processor as recited in claim 15 wherein the fetch unit is configured to fetch instructions from a plurality of threads for execution by the processor, and wherein the DCTI and the delay slot instruction are in a first thread of the plurality of threads, and wherein, if scheduling the DCTI is inhibited, the pick unit is configured to scheduling an instruction from a second thread of the plurality of threads.

21. A method comprising:
   fetching a delayed control transfer instruction (DCTI) into a processor; and
   delaying scheduling of the DCTI until a delay slot instruction of the DCTI is available for scheduling.

22. The method as recited in claim 21 further comprising scheduling the DCTI responsive to the delay slot instruction being available for scheduling.

23. The method as recited in claim 21 further comprising:
   fetching instructions from a plurality of threads, wherein the DCTI and the delay slot instruction are in a first thread of the plurality of threads; and
   scheduling an instruction from a second thread of the plurality of threads if the DCTI is delayed.

24. A processor comprising:
   a fetch unit configured to fetch instructions for execution by the processor; and
   a pick unit configured to schedule instructions fetched by the fetch unit for execution in the processor, wherein the pick unit is configured to inhibit scheduling a delayed control transfer instruction (DCTI) until a delay slot instruction of the DCTI is available for scheduling.

25. The processor as recited in claim 24 wherein the pick unit is configured to schedule the DCTI in response to the delay slot instruction being available.

26. The processor as recited in claim 24 wherein, if a second DCTI was previously scheduled and the DCTI is the delay slot instruction of the second DCTI, the pick unit is configured to inhibit scheduling of the DCTI at least until the second DCTI has executed.

27. The processor as recited in claim 24 wherein the fetch unit is configured to fetch instructions from a plurality of threads for execution by the processor, and wherein the DCTI and the delay slot instruction are in a first thread of the plurality of threads, and wherein, if scheduling the DCTI is inhibited, the pick unit is configured to scheduling an instruction from a second thread of the plurality of threads.

* * * * *